United States Patent [19]

Nakajima

[11] Patent Number: 4,920,952
[45] Date of Patent: May 1, 1990

[54] HEAT PROCESSING APPARATUS USING LIQUIFIED GAS

[76] Inventor: Masahiko Nakajima, 2-6, Yayoicho, Itabashi-ku, Tokyo, Japan

[21] Appl. No.: 226,389

[22] Filed: Aug. 1, 1988

[30] Foreign Application Priority Data

Aug. 5, 1987 [JP] Japan .............................. 62-194412
Aug. 17, 1987 [JP] Japan .............................. 62-125033

[51] Int. Cl.$^5$ ................................................ B23K 3/02
[52] U.S. Cl. ............................... 126/414; 126/401; 431/255; 431/266
[58] Field of Search ............... 126/413, 414, 409, 407, 126/404, 401; 431/255, 266, 344; 222/3; 228/51

[56] References Cited

U.S. PATENT DOCUMENTS

| | | | |
|---|---|---|---|
| 4,648,380 | 3/1987 | Nakajima | 126/414 |
| 4,688,551 | 8/1987 | Nakajima | 126/414 |
| 4,691,691 | 9/1987 | Patenaude | 126/414 |
| 4,785,793 | 11/1988 | Oglesby et al. | 126/414 |

Primary Examiner—Randall L. Green
Attorney, Agent, or Firm—James R. Longacre; Michael L. Keller

[57] ABSTRACT

In a heat processing apparatus in which a gas/air mixture is piezoelectrically ignited to heat the combustion catalyst by the ignited flame for taking place subsequent flameless catalytic combustion of the gas mixture, a portion of the gas in the flaming combustion space is directly discharged to the outside not passing through the combustion catalyst upon flame ignition, while the entire amount of the gas in the combustion space is introduced to the combustion catalyst after reaching the catalytic combustion, by using a discharge gas control mechanism interlocked with the operation of the ignition button, as well as the opening degree of the external air ports is changed variably so as to provide suitable gas/air ratios upon ignition, flame extinguishment and usual catalytic combustion respectively by the air flow rate control member also interlocked with the ignition button.

10 Claims, 8 Drawing Sheets

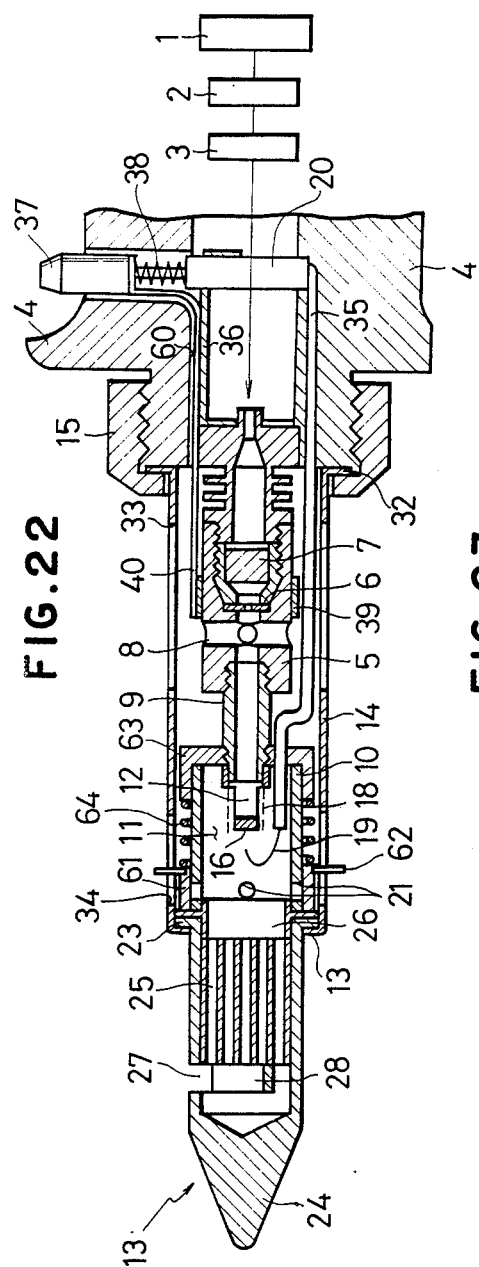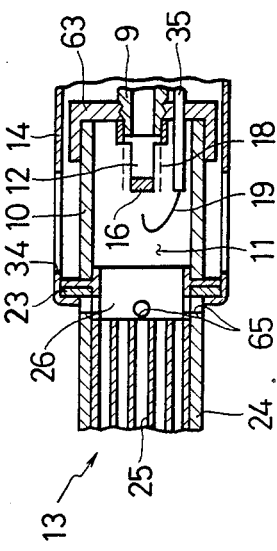

HEAT PROCESSING APPARATUS USING LIQUIFIED GAS

BACKGROUND OF THE INVENTION

1. Field of the Invention

The present invention concerns a heat processing apparatus using liquefied gas, for example, butane gas as a fuel gas and, particularly, it relates to a heat processing apparatus using liquefied gas and having piezoelectric ignition means.

2. Description of the Prior Art

Heat processing apparatus in which catalytic combustion is taken place for a gas mixture comprising liquefied gas and air and piezoelectric ignition means is used for the ignition of the gas mixture have generally been known, for example, as described in U.S. Pat. No. 4,133,301 Japanese Patent Publication No. Sho 55-46783).

By the way, combustion catalysts comprising catalyst ingredients carried on fiberous ceramic supports have usually been employed in the conventional heat processing apparatus of the afore-mentioned type for facilitating the ignition by piezoelectric ignition means. However, such combustion catalysts involve a problem that they are damaged by burning in a short period of time by the heat during combustion.

In view of the above, it is necessary to support the catalyst ingredient, for example, on a solid support having a sufficient wall thickness, but since such a solid catalyst can not be heated to a temperature required for the oxidizing reaction merely by ignition sparks of the piezoelectric ignition means, it is necessary to once ignit the gas mixture by piezoelectric ignition means or by an external lighting means (as disclosed in our prior U.S. Pat. No. 4,552,124), to cause combustion with a pilot flame (hereinafter referred to as flaming combustion) so that the combustion catalyst can be heated sufficiently by the heat of the gas flame.

Referring to the piezoelectric ignition, in a case where an iron tip member having a built-in combustion catalyst is disposed at the top end (downstream end in the direction of the gas stream) of a cylindrical flaming combustion chamber and a gas mixture jetted out to the inside of the flaming combustion chamber is ignited by piezoelectric ignition means for flaming combustion, the entire amount of gases in the flaming combustion chamber (the including gas mixture supplied and combustion exhaust gases formed) is discharged through the inside of the iron tip member to the outside. Accordingly, if the size of the iron tip member is small, or no sufficient combustion space can be ensured at the inside of the flaming combustion cylinder even if the size of the tip member is large, the gas mixture is over-charged, in other words, a smooth gas flow is hindered in the flaming combustion chamber failing to ignite the gas mixture.

Further, even when the gas in the flaming combustion chamber is discharged smoothly, if the amount of the gas mixture is increased and thus the flow velocity of the gas mixture is increased near the ignition electrode, ignition to the gas mixture is not easy and it is extremely difficult, particularly, during severely cold winter seasons, etc.

There is also a problem upon extinguishing a once ignited flame. Although it is necessary to put off the pilot flame after the temperature of the combustion catalyst has been elevated to the oxidizing reaction temperature by the heat of the flame in order to improve the heat efficiency and ensure safety, as well as to prevent the thermal degradation of the catalyst by the flame, the flame can not easily be extinguished if the flow rate of the gas mixture is great.

SUMMARY OF THE INVENTION

It is an object of the present invention to provide a heat processing apparatus using liquefied gas capable of igniting a gas mixture easily and reliably with piezoelectric ignition means even in a case where the size of an iron tip member is small, or in a case where no sufficient combustion space can be secured at the inside of the flaming combustion chamber, and capable of facilitating the operation.

It is another object of the present invention to provide a heat processing apparatus using liquefied gas capable of easily and reliably igniting the gas mixture with piezoelectric ignition means even in a case where the gas flow velocity is high, capable of rapidly and reliably extinguishing the flame after the combustion catalyst has been heated to an oxidizing reaction temperature thereby causing catalytic combustion for the entire amount of the gas mixture and also capable of easy operation.

The foregoing objects can be attained by the first, second and third aspects of the invention made by the present inventor and concerning heat processing apparatus using liquefied gas as described below.

The first aspect provides a heat processing apparatus using liquefied gas comprising:

means for jetting out a liquefied gas in a gas reservoir as a fuel gas, means, of a cylindrical configuration, disposed at the exit of the gas jetting means for sucking air from external air in-take ports by the ejector effect of a gas jetted out from the gas jetting means thereby generating a gas mixture, nozzle means disposed at the top end of the gas mixture generation means for jetting out the gas mixture to the inside of a cylindrical flaming combustion means, means for piezoelectrically igniting the gas mixture at the inside of the cylindrical flaming combustion means by the operation of an ignition button, iron tip means disposed at the top end of the cylindrical flaming combustion means and incorporating therein combustion catalyst means for causing flameless combustion of the gas mixture by oxidizing reaction, means disposed to the cylindrical flaming combustion means for controlling the amount of a gas discharged, which is adapted to open the top end of the cylindrical flaming combustion means to thereby discharge a portion of the gas in the cylindrical flaming combustion means directly to the outside not passing through the combustion catalyst means just before the ignition and which is adapted to close the top end of the cylindrical flaming combustion means to thereby introduce the entire amount of the gas in the cylindrical flaming combustion means to the combustion catalyst means after the completion of the flaming combustion, and means for interlocking the gas discharge amount control means with the ignition button.

The second aspect provides a heat processing apparatus using liquefied gas comprising:

means for jetting out a liquefied gas in a gas reservoir as a fuel gas, means, of a cylindrical configuration, disposed at the exit of the gas jetting means for sucking air from external air in-take ports by the ejector effect of a gas jetted out from the gas jetting means thereby generating a gas mixture, nozzle means disposed at the top end of the gas mixture generation means for jetting out the gas mixture to the inside of a cylindrical flaming combustion means, means for piezoelectrically igniting the gas mixture at the inside of the cylindrical flaming combustion means by the operation of an ignition button, iron tip means disposed at the top end of the cylindrical flaming combustion means and incorporating therein combustion catalyst means for causing flameless combustion of the gas mixture by oxidizing reaction, means disposed to the cylindrical flaming combustion means for controlling the amount of a gas discharged, which is adapted to open the top end of the cylindrical flaming combustion means to thereby discharge a portion of the gas in the cylindrical flaming combustion means direction to the outside not passing through the combustion catalyst means just before the ignition and which is adapted to close the top end of the cylindrical flaming combustion means to thereby introduce the entire amount of the gas in the cylindrical flaming combustion means to the combustion catalyst means after the completion of the flaming combustion, means for interlocking the gas discharge amount control means with the ignition button, and means for controlling air flow rate adapted to displace along the outer surface of the gas mixture generation means interlocking with the interlocking means, thereby decreasing the opening area of the external air in-take ports to generate a gas mixture lacking in air just before the ignition, reducing to zero or extremely enlarging the opening area of the external air in-take ports to extinguish the gas flame after the completion of the flaming combustion and, further, returning the opening area of the external air in-take ports to the optimun degree after extinguishing the flame.

That is, the second aspect comprises, in addition to the constitution of the first aspect described above, an air flow rate control means adapted to move on the outer surface of the gas mixture generation means interlocking with the interlocking means for decreasing the opening area of the external air in-take ports to generate a gas mixture lacking in air just before the ignition, for reducing to zero or extremely enlarging the opening area of the external air in-take ports after the flaming combustion to conduct fire extinguishment and, further, returning the opening are of the external air in-take ports to the optimum degree after the fire extinguishment, The third aspect provides a heat processing apparatus using liquefied gas comprising:

means for jetting out a liquefied gas in a gas reservoir as a fuel gas, means, of a cylindrical configuration, disposed at the exit of the gas jetting means for sucking air from external air in-take ports by the ejector effect of a gas jetted out from the gas jetting means thereby generating a gas mixture, nozzle means disposed at the top end of the gas mixture generation means for jetting out the gas mixture to the inside of a cylindrical flaming combustion means, means for piezoelectrically igniting the gas mixture at the inside of the cylindrical flaming combustion means by the operation of an ignition button, iron tip means disposed at the top end of the cylindrical flaming combustion means and incorporating therein combustion catalyst means for causing flameless combustion of the gas mixture by oxidizing reaction, a gas discharge means formed at least to a portion of the cylindrical flaming combustion means, the iron tip means or between the cylindrical flaming combustion means and the iron tip means, and adapted to be opened at least just before the ignition for discharging a portion of the gas in the cylindrical flaming combustion means directly to the outside not passing through the combustion catalyst means, means for controlling air flow rate disposed movably at the outer surface of the gas mixture generation means and adapted to displace along the outer surface of the gas mixture generation means, thereby decreasing the opening area of the external air in-take ports to generate a gas mixture lacking in air just before the ignition, reducing to zero or extremely enlarging the opening area of the external air in-take ports to extinguish the flame after the completion of the flaming combustion and further returning the opening area of the external air in-take port to the optimum degree after extinghishing the flame, and an interlocking means for interlocking the air flow rate control means with the ignition button.

That is, in the third aspect, the gas discharge amount control means in the second aspect is replaced with gas discharge means disposed at least to a portion of the cylindrical flaming combustion means, the iron tip means or between the cylindrical flaming combustion means and the iron tip means, and adapted to be opened at least just before the ignition to discharge a portion of the gas in the cylindrical flaming combustion means directly to the outside without passing through the combustion catalyst means.

DETAILED DESCRIPTION OF THE INVENTION

In the heat processing apparatus using liquefied gas according to the first aspect, when a liquefied gas in a gas reservoir is jetted out from a gas jetting means as a fuel gas, air is sucked through external air in-take ports by the ejector effect of the jetted gas to generate a gas mixture in the cylindrical gas mixture generation means. The gas mixture is jetted out from a nozzle means to the inside of a cylindrical flaming combustion means and ignited by the operation of an ignition button of piezoelectric ignition means.

As has been described above, if the size of the iron tip means is small, or no sufficient combustion space be obtainable to the inside of the cylindrical flaming combustion means, the gas mixture is excessively charged, that is, smooth gas flow is hindered at the inside of the cylindrical flaming combustion means failing to ignite the gas even if the ignition button is actuated.

In view of the above in accordance with the first aspect, an opening leading directly to the external atmosphere, is formed at or near, the top end of the cylindrical flaming combustion means just before the ignition by means of a gas discharge amount control means interlocking with the operation of the ignition button by way of an interlocking means to thereby discharge a portion of the gas in the cylindrical flaming combustion means directly to the outside not passing through the combustion catalyst.

This can avoid the excessive charge, that is, enables smooth flow of the gas mixture at the inside of the cylindrical flaming combustion means and the combustion gas can reliably be ignited to take place flaming combustion by the operation of the ignition button.

After the heating of the combustion catalyst the flaming combustion, the gas discharge amount control means is operated interlocking with the ignition button to close the opening at or near the top end of cylindrical flaming combustion means, by which the entire amount of the gas in the cylindrical flaming combustion means is introduced to the combustion catalyst means to cause flameless combustion by the combustion catalyst means and the gas flame in the flaming combustion means if extinguished.

In the heat processing apparatus using liquefied gas according to the second aspect, since the air flow rate control means is disposed, in addition to the constitution of the first aspect described above, the opening area of the external air in-take ports is decreased to generate a gas mixture lacking in air just before the ignition, the opening area of the external air in-take ports is reduced to zero or enlarged extremely to extinguish the flame after the flaming combustion and, further, the opening area of the external air in-take ports is returned to an optimum degree after extinguishing the flame.

By the way, in a case where the amount of gas mixture is increased to make the flow velocity of the gas mixture more rapid near of the ignition electrode even if the top end of the cylindrical flaming combustion means is opened to discharge the portion of the gas in the cylindrical flaming combustion means directly to the outside just before the ignition, it may sometime be still insufficient for the ignition reliable. Further, even if the top end of the cylindrical flaming combustion means is closed after the flame has once been ignited, it can not always lead to the flame extinguishment only by itself.

In the second aspect, since the gas mixture at a high gas/air mixing ratio easy to ignite is generated just before the ignition by the air flow rate control means and, in addition, since the flow velocity of the gas mixture is reduced by so much as the the amount of air supplied is reduced, it is possible for reliable ignition by the operation only for once.

Furthermore, since the opening area of the external air in-take ports is reduced to zero or enlarged extremely after the flaming combustion, the conditions for flaming combustion are terminated to reliably extinguish the gas flame.

Furthermore, since the opening area of the external air in-take ports is returned to the optimum degree initial state after the flame extinguishment, the gas mixture at an optimum mixing ratio to the combustion catalytic is supplied to the combustion catalyst to cause complete flameless combustion. All of these operations can be conducted while interlocking only with the operation of the ignition button.

By the way, in a case where no sufficient combustion space can be secured at the inside of the cylindrical flaming combustion means, or the amount of the gas mixture is increased, it is necessary to open the top end of the cylindrical flaming combustion means to discharge a portion of the gas in the cylindrical flaming combustion means directly to the outside not passing through the combustion catalyst means. However, upon flame extinguishment in the heat processing apparatus having the air flow rate control mechanism as in the second aspect, the flame may sometimes be extinguished by merely actuating the air flow rate control mechanism without closing the top end of the cylindrical flaming combustion means upon flame extinguishment.

In view of the above, in the third aspect, the top end of the cylindrical flaming combustion means is opened at least just before the ignition by the gas discharge means disposed at least to portion a of the cylindrical flaming combustion means, iron tip means, or between the cylindrical flaming combustion means and the iron tip means to discharge a portion of the gas in the cylindrical flaming combustion means directly to the outside not passing through the combustion catalyst. That is, the gas discharge means may either be closed or left open upon extinguishing the flame.

DESCRIPTIONS OF THE ACCOMPANYING DRAWINGS

These and other objects, features and advantages of the invention will become more apparent upon reading the following detailed descriptions and drawings, in which;

FIG. 22 is a view, corresponding to FIG. 1, illustrating the ninth embodiment according to the present invention; and FIG. 23 is a cross sectional view illustrating a portion of the tenth embodiment according to the present invention.

DESCRIPTION OF THE PREFERRED EMBODIMENTS

Figure 1:
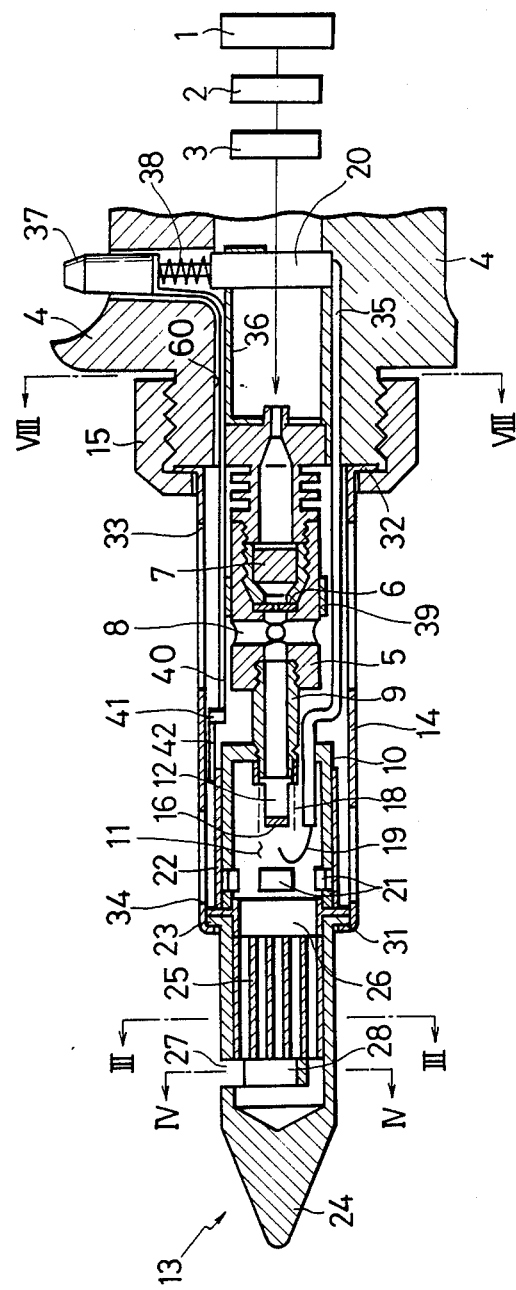
FIG. 1 is a cross sectional view of a heat processing apparatus illustrating the first embodiment according to the present invention.

The first embodiment of the present invention is to be explained at first referring to the drawings.

FIG. 1 illustrates one embodiment of a heat processing apparatus using liquefied gas used for soldering, welding, etc. according to the present invention, wherein a gas reservoir 1 for storing liquefied gas as a fuel, a flow rate control valve 2 and an ON-OFF valve 3 are incorporated in the hollow portion of a grip 4.

As shown in FIG. 1, a cylindrical gas mixture generation member 5 is disposed at the top end of the grip 4 for mixing air into a fuel gas discharged from the ON-OFF valve 3 to generate a gas mixture with the top end thereof being protruded from the grip 4. Also as shown in FIG. 1, a disk-like nozzle plate 6 having a nozzle aperture at the center and a filter member 7 made of porous sintered metal, etc. is detachably assembled to the inside of the gas mixture generation member 5.

Further, at the exit side (downstream) of the nozzle plate 6 of the gas mixture generation member 5, there are external air in-take ports 8 formed, for example, by the number of four at an equal distance in the circumferential direction for sucking air from the outside by the ejector effect of the fuel gas when it is jetted out from the nozzle plate 6, thereby generating a gas mixture, so that an optimum gas/air mixing ratio for catalytic combustion can be obtained when all of the four external air in-take ports 8 are opened fully.

A connection pipe 9 is engaged by a thread engagement at its base end into the top end of the gas mixture generation member 5 (here and hereafter "top end" for each of components usually means "leftmost end", whereas "base end" means "rightmost end" in each of the drawings). A flaming combustion means 10 of a cylindrical shape which is opened at the top end and defines an flaming combustion space 11 at the inside, is secured to the top end of the connection pipe 9 and a nozzle member 12 in communication with the connection pipe 9 is situated about at the center of the bottom of the flaming combustion means or cylinder 10. An iron tip member 13 is disposed at the top end of the flaming combustion cylinder 10, and the tip member 13 is held by a support pipe 14 that encloses the outside of a flaming combustion cylinder 10, etc. and a nut member 15 for fixing the support pipe 14 to the grip 4.

Figure 2:
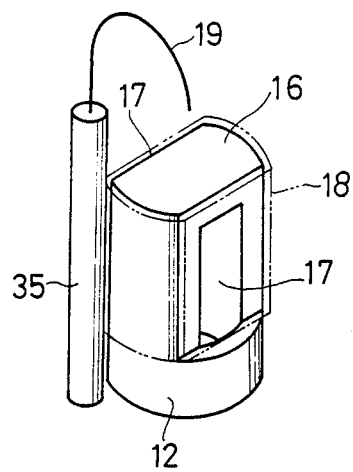
FIG. 2 is a perspective view illustrating a fire nozzle member and a ignition plug used for the apparatus.

As shown in FIG. 1 and FIG. 2, the nozzle member 12 is of a cylindrical shape closed at its top end by a baffle plate 16 and has a gas mixture jetting port 17 comprising a plurality of openings formed to the circumferential surface thereof. A buffering and diffusing member 18 made of material having a plurality of small openings such as a metal gage is disposed to the outer circumferential surface of the nozzle member 12. Accordingly, the gas mixture supplied from the connection pipe 9 is abutted against the baffle plate 16 and branched into a plurality of streams by the same number as that of the openings of the gas mixture jetting port 17 (branched into two streams in the case of the illustrated embodiment), discharged from each of the openings of the gas mixture jetting port 17, buffered and diffused through the buffering and diffusing member 18 and then supplied to the flaming combustion space 11.

Also as shown in FIG. 1 and FIG. 2, an ignition electrode 19 is disposed with its top end being opposed at a predetermined gap to the top end of the baffle plate 16 of the nozzle member 12, so that electric discharge is taken place between the top end of the ignition electrode 19 and the top end of the baffle plate 16 to ignite the gas mixture in the flaming combustion space 11.

As shown in FIG. 1, a plurality of gas discharge ports 21 are formed through the circumferential wall surface near the top end of the flaming combustion cylinder 10, and the gas discharge ports 21 are adapted to be opened and closed by a cylindrical shutter 22 attached axially slidably to the outer surface of the flaming combustion cylinder 10. The shutter 22 and the gas discharge ports 21 constitute a gas discharge amount control mechanism.

Figure 3:
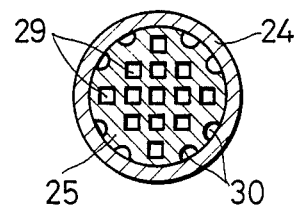
FIG. 3 is an enlarged cross sectional view taken along line III—III in FIG. 1.

As shown in FIG. 1 and FIG. 3, the iron tip member 13 comprises a tip main body 24 having a cylindrical base end extended outwardly into a flange 23, a combustion catalyst 25 incorporated to the inside of the tip main body 24 and an anti-slip off member 26 secured to the base end of the tip main body 24 for preventing the combustion catalyst 25 from slipping off. A main discharge port 27 is formed to the tip main body 24 on the top end of the combustion catalyst 25 for discharging the combustion exhaust gases after the flameless combustion in the combustion catalyst 25.

Figure 4:
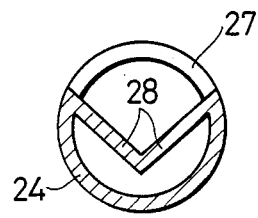
FIG. 4 is an enlarged cross sectional view taken along line IV—IV in FIG. 1.

As shown in FIG. 1 and FIG. 4, the main discharge port 27 is formed by cutting and inwardly bending a portion of the circumferential wall of the tip main body 24 into a V-like configuration by means of pressing, etc. thereby forming a bent portion 28. The bent portion 28 functions to hinder the displacement of the combustion catalyst 25 toward the top end and enables the discharge of the combustion exhaust gases from the combustion catalyst 25 through the main discharge port 27 after properly moderating the flow velocity thereof. This can avoid accidental burning injury, etc. which may otherwise be caused by exhaust gases vigorously discharged from the main discharge port 27.

As shown in FIG. 1 and FIG. 3, the combustion catalyst 25 comprises a columnar solid support made of ceramics in which a plurality of through holes 29 and U-shaped grooves 30 are formed to the inside and at the circumferential surface thereof respectively, and a catalyst ingredient containing platinum and rhodium is supported on the wall surface of the support. The through holes 29 and the U-shaped grooves 30 function to define axial linear gas flow channels in the combustion catalyst 25, so that flameless combustion can occur smoothly.

As shown in FIG. 1, the support pipe 14 made of corrosion resistant metal material is formed into a cylindrical shape. The top end of the pipe 14 is extended inwardly into an inner flange portion 31, which is engaged with the flange 23 of the top main body 24 described above, while the base end of the pipe 14 is extended into a flange 32 which is engaged with the inside of the nut member 15. Further, as shown in FIG. 1, air ports 33 corresponding to the external air in-take ports 8 and exhaust ports 34 corresponding to the gas discharge ports 21 of the flaming combustion cylinder 10 are perforated respectively.

Meanwhile, as shown in FIG. 1, a piezoelectric ignition device 20 is incorporated to the inside of the grip 4 and a positive (+) terminal thereof is connected to the fire nozzle member 12 by way of an insulated high voltage cable 35 to the ignition electrode 19, while the negative (−) terminal thereof is connected to the nozzle member 12 by way of a guide member 36 disposed between the gas mixture generation member 5 and the piezoelectric ignition device 20, the gas mixture generation member 5 and the connection pipe 9. Furthermore, the ignition button 37 for the piezoelectric ignition device 20 is protruded outwardly from the grip 4, and the button 37 is normally urged outwardly by the resiliency of a spring 38.

This embodiment is so adapted that when the ignition button 37 is pressed against the resiliency of the spring 38, electric discharge takes place between the top of the ignition plug 19 and the top end of the baffle plate 16 as described above and, at the same time, the air flow rate control member 39 and the shutter 22 that also serve as a flame extinguishing member conduct the predetermined operation described later, being interlocked with the ignition button 37.

As shown in FIGS. 1, 5, 6 and 7, the air flow rate control member 39 of a short cylindrical shape is mounted axially slidably to the outer circumferential surface of the gas mixture generation member 5, and the member 39 is connected with the ignition button 37 by way of a connection member 40.

Figure 6:
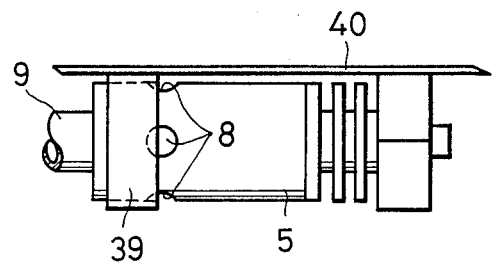
Figure 7:
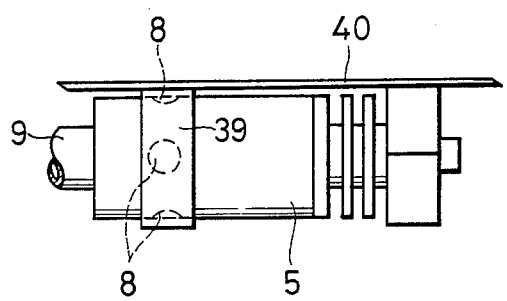
Figure 8:
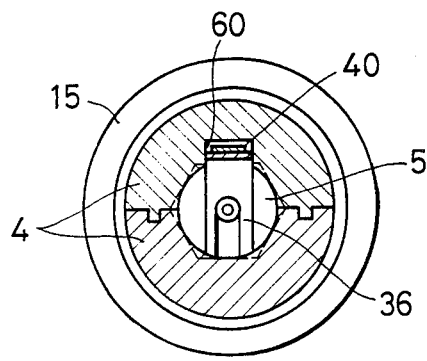
FIG. 8 is a cross sectional view taken along line VIII—VIII in FIG. 1.

As shown in FIG. 1 and FIG. 5 through FIG. 8, the connection member 40 of a thin plate-like shape made of properly rigid and flexible material, for example, stainless steel is bent at its base end in the grip 4 and then secured to the ignition button 37, while the member 40 is extended at its top end axially along the outer surface of the gas mixture generation member 5. The portion of the connection member 40 situated at the inside of the grip 4 is disposed within a guide groove 60 formed to the grip 4, in such a state that the lower side of the number 40 is supported on the gas mixture generation member 5 and the guide member 36 as shown in FIG. 1 and FIG. 8, so that the vertical movement of the ignition button 37 can be converted smoothly into the horizontal (left to right) movement of the connection member 40 in FIG. 1.

The top end of the connection member 40 is connected to the shutter 22 by way of an operation direction change arm 41 and an interlocking member 42 described later, while the intermediate portion of the connection member 40 is directly connected to the air flow rate control member 39. The connection member 40, the operation direction change arm 41 and the interlocking member 42 constitute an interlocking mechanism for interlocking the shutter 22 with the movement of the ignition button 37.

Figure 9:
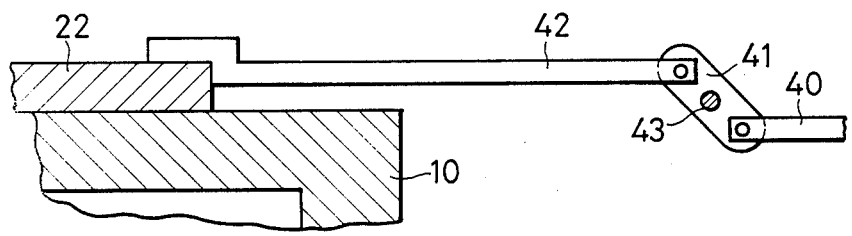
FIG. 9 is an enlarged view for a portion of the apparatus shown in FIG. 1.

The operation direction change arm 41 is pivotally attached at its longitudinal center to a support pin 43 as shown in FIG. 9 and the support pin 43 is secured, for example, to the connection pipe 9 by means of a fixing member not illustrated. The lower end of the operation direction change arm 41 is pivotally engaged with the top end of the connection member 40, while the upper end of the change arm 41 is pivotally engaged with the base end of the interlocking member 42, which is secured at its top end to the shutter 22. This mechanism is so adapted that when the connection member 40 moves leftwardly, the shutter 22 moves rightwardly and vice versa in FIG. 9.

Operation

The operation of the first embodiment of the heat processing apparatus according to the present invention having thus been described is to be explained next.

In a state where the ignition button 37 is not pressed but left free, the shutter 22 closes the gas discharge ports 21 of the flaming combustion cylinder 10, while the air flow rate control member 39 lets the external air in-take port 8 fully open as shown in FIG. 1.

When the ON-OFF valve 3 is opened in this state, the fuel gas is discharged from the gas reservoir 1 at a flow rate set by the flow rate control valve 2, mixed with air sucked through the external air in-take ports 8 into a gas mixture at a mixing ratio optimum to the combustion in the gas mixture generation member 5. Then, the catalytic gas mixture is sent by way of the connection pipe 9 and jetted out from the nozzle member 12 into the flaming combustion space 11. Then, the ignition button 37 is pressed against the resiliency of the spring 38 to cause electric discharge between the top of the ignition plug 19 and the top end of the baffle plate 16.

By the way, if the size of the iron tip member 13 is small or if no sufficient combustion space can be ensured in the flaming combustion chamber 10 even if the size of the tip member 13 is large, ignition to the gas mixture may sometimes fail as described above.

In view of the above, in the present embodiment, the shutter 22 that interlockes with the ignition button 37 is actuated to open the gas discharge ports 21 of the flaming combustion cylinder 10 just before the ignition, so that a portion of the gas in the flaming combustion cylinder 10 is directly discharged to the outside without sending to the iron tip member 13. This makes the gas stream smooth, i.e., can avoid the excessive charge of the gas in the flaming combustion space 11 and enables to ignite the gas mixture easily and surely by the igniting operation only for once.

By the way, if the excessive charge of the gas mixture in the flaming combustion chamber 11 is avoided by opening the gas discharge ports 21, ignition is possible by the operation only for once in most cases. However, if the flow velocity of the gas mixture discharged from the nozzle member 12 is high, ignition to the gas mixture may sometimes to impossible even in such cases as described above.

In view of the above, in the present embodiment, ignition taken place after actuating the air flow rate control member member 39 that interlocks with the ignition button 38 for attaining an easily ignitable condition for the gas mixture.

Figure 5:
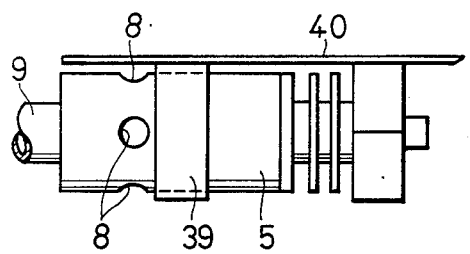
FIG. 5 through FIG. 7 are, respectively, explanatory views illustrating the operation sequence of an air flow rate control member.

When the igniting operation is made by pressing the ignition button 37, the position of the air flow rate control member 39 is shifted from the initial state shown in FIG. 5 (where the external air in-take ports 8 are fully opened) to the state shown in FIG. 7 (where the external air in-take ports 8 are fully closed) and then into the state shown in FIG. 6, where the ignition is conducted. In the state shown in FIG. 6, all of the four external air in-take ports 8 are closed each by $\frac{1}{3}$-$\frac{1}{4}$ and the total open area of the external air in-take ports 8 is adjusted to 67–75% based on the 100% at which they are fully opened. Then, the amount of air supplied is decreased by so much and the flow velocity of the gas mixture jetted out from the nozzle member 12 is reduced and, in addition, a gas mixture lacking in air, that is, at a high gas/air ratio easy to ignite is formed. In addition, since the electric discharge is taken place at the top end of the baffle plate 16, where the flow velocity of the gas mixture is further reduced, reliable ignition can be made even in severely cold winter seasons, etc.

The ignited gas mixture is subjected to flaming combustion in the flaming combustion space 11 and the combustion catalyst 25 is heated to a temperature required for oxidizing reaction by the heat of the pilot flame in about 1-2 seconds after the ignition.

Then, when the pressing force applied so far to the ignition button 37 is removed, the ignition button 37 is automatically returned by the resiliency of the spring 38 to the state as shown in FIG. 1. Then, the shutter 22 is actuated interlocking with this movement to close the gas discharge ports 21 of the flaming combustion cylinder 10. In most cases, the gas flame is extinguished merely by closing the gas discharge ports 21 and the entire amount of the gas mixture is directly sent to the combustion catalyst 25 in which flameless complete combustion taken place. However, in a case where the flow velocity of the gas mixture discharged from the nozzle member 12 is great, the gas flame would not sometimes be extinguished by the mere closure of the gas discharge ports 21.

In view of the above, in this embodiment, the flame is extinguished by using the air flow rate control member 39 interlocking with the ignition button 37.

That is, when the pressing force to the ignition button 37 is removed, the air flow rate control member 39 is shifted from the state shown in FIG. 6 through the state shown in FIG. 7 into the state shown in FIG. 5. In the state shown in FIG. 7, since all of the four external air in-take ports 8 are closed, a gas not containing air at all is jetted out from the nozzle member 12. In addition, since most of the air in the flaming combustion space 11 has already been exhausted during flaming combustion, there remains no air at all required for the flaming combustion. Accordingly, it is possible to momentarily extinguish the gas flame in the flaming combustion space 11.

Figure 10:
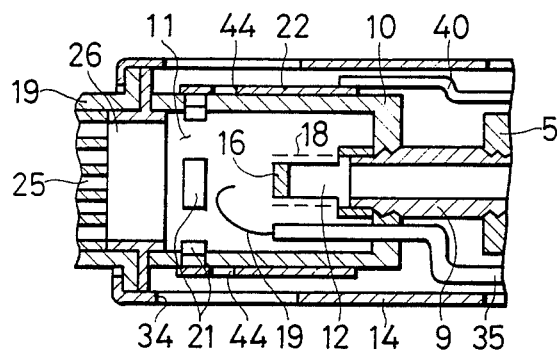
FIG. 10 is a view, corresponding to FIG. 9, illustrating a portion of the second embodiment according to the present invention.

FIG. 10 shows the second embodiment according to the present invention, in which the top end of the connection member 40 is directly secured to the shutter 22, and apertures 44 are formed to the shutter 22, so that the aperture 44 align with the gas discharge ports 21 to let the ports 21 open just before the ignition upon pressing the ignition button 37 and so that the gas discharge ports 21 are closed by the shutter 22 in other states. With such a constitution, the same effect as that described for the first embodiment can be obtained.

Figure 11:
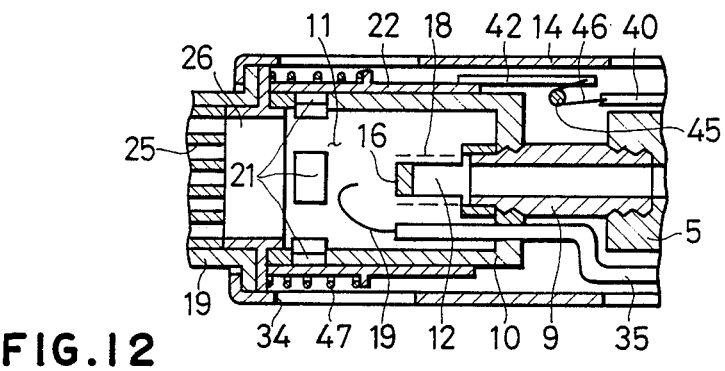
FIG. 11 is a view corresponding to FIG. 9, illustrating a portion of the third embodiment according to the present invention.

FIG. 11 shows the third embodiment according to the present invention, in which the top end of the connection member 40 and the base end of the interlocking member 42 are connected with each other by way of a string 46 wound around a pin 45 secured to a fixed portion, for example, to the connection pipe 9. The shutter 22 is always urged resiliently toward the connection member 40 by a coil spring 47 with a resilient force which is weaker than that of the spring 38 of the ignition button 37 (refer to FIG. 1).

With such a constitution, when the ignition button 37 is pressed, the string 46 is loosened, by which the shutter 22 is caused to slide rightwardly in the drawing by the resiliency of the coil spring 47 and the gas discharge ports 21 are opened. Then, when the pressing force to the ignition button 37 is removed, the shutter 22 is caused to slide leftwardly in the drawing against the resiliency of the coil spring 47 to thereby close the gas discharge ports 21 with the shutter 22. Thus, the same effect as described for the first embodiment can be obtained.

Figure 12:
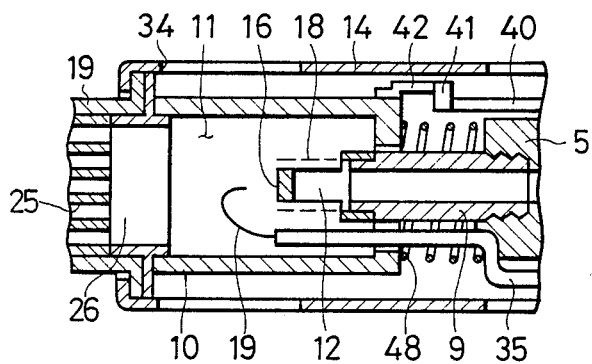
FIG. 12 is a view, corresponding to FIG. 9, illustrating a portion of the fourth embodiment according to the present invention.

FIG. 12 shows the fourth embodiment according to the present invention, wherein the flaming combustion cylinder 10 is made slidable in the direction of toward and away from the iron tip member 13 along the connection pipe 9 and the high voltage cable 35. The flaming combustion cylinder 10 is always urged resiliently toward the iron tip member 13 by the coil spring 48, and the flaming combustion cylinder 10 and the connection member 40 are connected by way of the same operation direction change arm 41 and the interlocking member 42 as those in the first embodiment described above.

With such a constitution, when the ignition button 37 (refer to FIG. 1) is pressed, the flaming combustion cylinder 10 is caused to slide rightwardly in the drawing against the resiliency of the coil spring 48, by which the space is formed between the iron tip member 13 and the flaming combustion cylinder 10. On the other hand, if the pressing force to the ignition button 37 is removed, the flaming combustion cylinder 10 is caused to slide leftwardly in the drawing by the resiliency of the coil spring 48 to close the space between the tip member 13 and the cylinder 10. Accordingly, the same effect as described for the first embodiment can be obtained.

Figure 13:
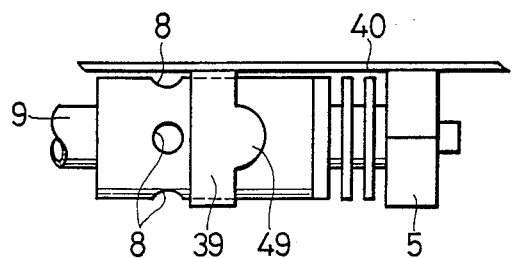
FIG. 13 through FIG. 15 are views, corresponding respectively to FIG. 5 through FIG. 7, illustrating a portion of the fifth embodiment according to the present invention.
Figure 14:
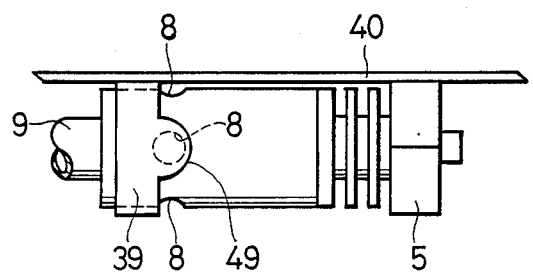
Figure 15:
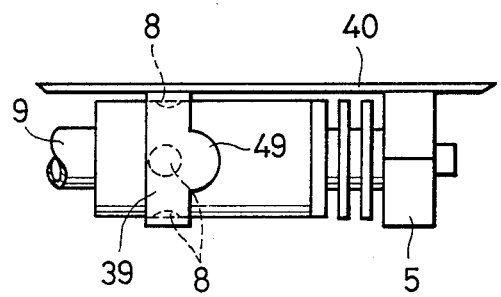

FIG. 13 through FIG. 15 illustrate the fifth embodiment according to the present invention, in which a protrusion 49 is disposed at one position on the circumference of the air flow rate control member 39, so that the protrusion 49 can fully close one of the four external air in-take ports 8 upon flame ignition, whereas all of the four external air in-take ports 8 are closed fully by the main body of the air flow control member 39 upon extinguishing the gas flame.

With such a constitution the same effect as described for the first embodiment can be obtained.

Figure 16:
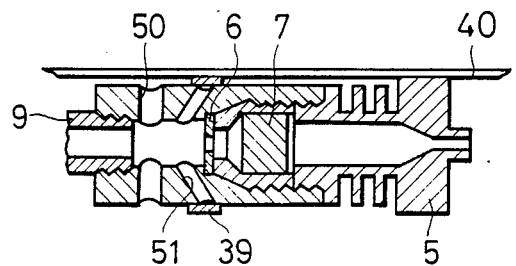
FIG. 16 through FIG. 18 are views, corresponding respectively to FIG. 5 through FIG. 7, illustrating a portion of the sixth embodiment according to the present invention.
Figure 17:
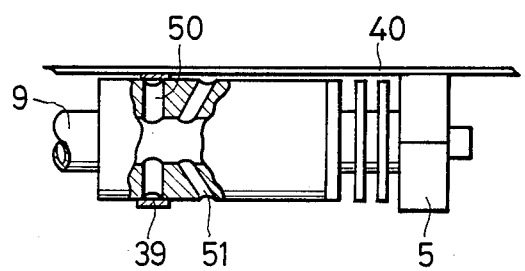
Figure 18:
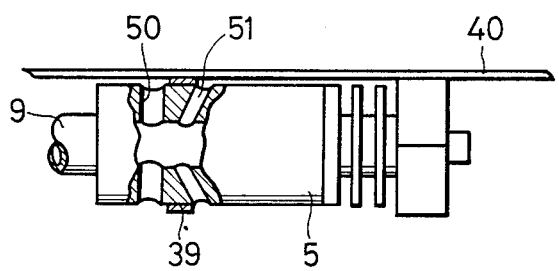

FIG. 16 through FIG. 18 illustrate the sixth embodiment according to the present invention, in which external air in-take ports 50 and 51 are disposed instead of the external air in-take ports 8 in the first embodiment, so that the opening area of the external air in-take ports is made much greater for extinguishing the gas flame. That is, each pair of the external air in-take ports 50 and 51 is perforated at the outer circumferential surface of the gas mixture generation member 5 with an axial gap therebetween which is greater than the lateral width of the air flow rate control member 39. The opening area of the external air in-take port 50 is set to such a size that a gas mixture of an optimum mixing ratio to the combustion can be obtained only by this port 50, while the opening area of the external air in-take port 51 is set to 67–75% of the opening area of the external air in-take port 50. They are adapted such that the external air in-take port 51 is closed by the air flow rate control member 22 during usual combustion as shown in FIG. 16, the external air in-take port 50 is closed by the air flow rate control member 39 upon ignition as shown in FIG. 17 and both of the external air in-take ports 50 and 51 are opened upon extinguishing the flame as shown in FIG. 18.

When both of the external air in-take ports 50 and 51 are opened, an air-enriched gas mixture at an extremely low gas/air mixing ratio is formed, by which the conditions for flaming combustion are broken, thereby enabling certain extinguishing the flame. Accordingly, the same effect as extinguishing of the flame by fully closing the external air in-take ports can be obtained.

Figure 19:
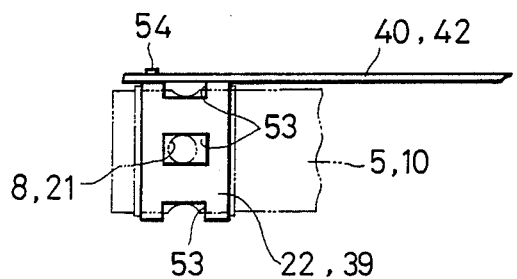
FIG. 19 is a view, corresponding to FIG. 5, illustrating a portion of the seventh embodiment according to the present invention.
Figure 20:
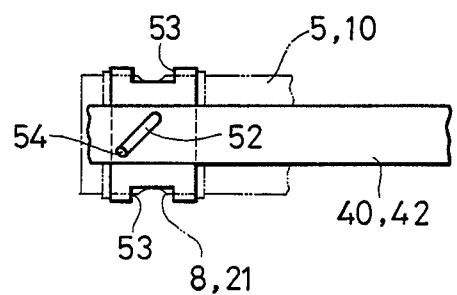
FIG. 20 is a plan view of FIG. 19.

FIG. 19 and FIG. 20 show the seventh embodiment according to the present invention, in which an elongate aperture 52 is formed to the connection member 40 or the interlocking member 42 oblique to the operating direction, apertures 53 corresponding to the external air in-take ports 8 or the gas discharge ports 21 are disposed to the shutter 22 or the air flow control member 39 and a pin 54 engaging the elongate aperture 52 is disposed, so that the shutter 22 or the air flow rate member 39 is moved circumferentially by the operation of the connection member 40 or the interlocking member 42 to control the opening degree of the external air in-take ports 8 or the gas discharge ports 21.

Also with such a constitution, if the opening degree of the gas discharge ports 21 is controlled in the same way as that for the first embodiment, the same effect as described for the first embodiment can be expected.

Figure 21:
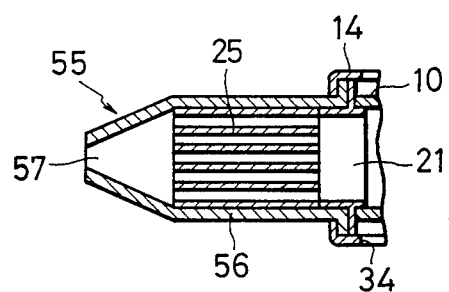
FIG. 21 is a cross sectional view illustrating a portion of the eighth embodiment according to the present invention.

FIG. 21 shows the eighth embodiment according to the present invention, which uses an iron tip member 55 having a tip main body 56 that discharges combustion exhaust gases as a hot blow from a discharge port 57 at the top and instead of the iron tip member 13 in the first embodiment.

By using such an iron tip member 55, it is possible to conduct soldering, welding or melting of synthetic resins, or coating, drying, heating, etc. of synthetic resin films.

FIG. 22 shows a ninth embodiment according to the present invention, in which a shutter 61 for opening and closing the gas discharge ports 21 irrespective of the operation of the ignition button 37 is disposed as a gas discharge mechanism, instead of the shutter 22 in the first embodiment.

That is, each of the gas discharge ports 21 disposed to the circumferential wall at the top end of the flaming combustion cylinder 10 is adapted to be opened and closed by a cylindrical shutter 61 which is disposed axially slidably to the outer circumference of the flaming combustion cylinder 10. As shown in FIG. 22, pins 62 projected radially are planted, for example, by two by a threading engagement to the outer circumference at the base end of the shutter 61 and a coil spring 64 is mounted between a dish-like receptacle member 63 disposed to the base end of the flaming combustion cylinder 10 and the shutter 61 for normally urging the shutter 61 resiliently toward the iron tip member 13. In the usual state, the gas discharge ports 21 of the flaming combustion cylinder 10 are closed by the shutter 61 and all of the gas in the flaming combustion cylinder 10 (gas mixture and combustion exhaust gas) is introduced to the iron tip member 13. Then, in a state where the gas discharge ports 21 of the flaming combination cylinder 10 is opened by actuating the shutter 61 against the resiliency of the coil spring 64, a portion of the gas in the flaming combustion cylinder 10 is directly discharged to the outside from the gas discharge ports 21 and the amount of the gas introduced to the iron tip member 13 is decreased by so much.

In the present invention, as can be seen from FIG. 22, the connection member 40 connects only the air flow rate control member 39 to the ignition button 37. Other constitutions and functions are the same as those described for the first embodiment.

The gas discharge ports 21 are opened by actuating the shutter 61 before pressing the ignition button 37 for ignition, while the gas discharge ports 21 are closed by the shutter 61 before, simultaneously or after removing the pressing force to the ignition button 37. Thus, the same effects as those described for the first embodiment can be obtained regarding the igniting and extinguishing functions, although the operations are somewhat complicated.

FIG. 23 shows the tenth embodiment according to the present invention, in which gas discharge ports 65 which are always opened are disposed at a portion on the base end of the tip member main body 24, where the anti-slip off member 26 is secured, instead of the gas discharge ports 21, the shutter 61, etc. in the ninth embodiment. The gas discharge ports 65 may also be disposed between the flaming combustion cylinder 10 and the tip member 13, for example, at the flange portion of the anti-slip off member 26. Further, the shutter 61 and the coil spring 64 in the ninth embodiment can be saved and the gas discharge ports 21 can be used as they are as the gas discharge port 65. Other constitutions and functions are the same as those described for the ninth embodiment.

In a case where no sufficient combustion space can be secured or the flow rate of the gas mixture is increased at the inside of the flaming combustion cylinder 10, ignition becomes extremely difficult unless the top end of the flaming combustion cylinder 10 is opened to discharge a portion of the gas in the flaming combustion cylinder 10 directly to the outside without passing through the combustion catalyst 25 upon ignition as described above. In view of the above, it is necessary to open the top end portion of the flaming combustion cylinder 10 at least just prior to the ignition.

On the other hand, the gas flame can reliably be extinguished by setting the opening area of the gas discharge ports 65 to an optimum degree by compulsorily breaking the conditions for flaming combustion by using the air flow rate control member 39 upon extinguishing the flame even if the top end portion of the flaming combustion cylinder 10 is left open. This embodiment is suitable to the such a case and it enables to simplification of the structure.

Although no particular explanations have been made for the ninth embodiment and the tenth embodiment, it is of course possible to adapt the structures as shown in FIG. 13 through FIG. 21 in the same way as in the case of the first embodiment.

As many apparently widely different embodiments of this invention may be made without departing from the spirit and scope thereof, it is to be understood that the invention is not limited to the specific embodiments thereof except as defined in the appended claims.

What is claimed is:

1. A heat processing apparatus using liquefied gas comprising:
    (a) means for jetting out a liquefied gas in a gas reservoir as a fuel gas;
    (b) means, of a cylindrical configuration, disposed at the exit of said gas jetting means having external air in-take ports for sucking external air by the ejector effect of a gas jetted out from said gas jetting means thereby generating a gas mixture;
    (c) nozzle means disposed at a downstream end of said gas mixture generation means for jetting out said gas mixture;
    (d) means, of a cylindrical configuration, disposed downstream of said nozzle means and having a flaming combustion chamber;

(e) an iron tip means disposed at a downstream end of said flaming combustion means in flow communication therewith;

(f) a catalyst means incorporated in said iron tip means for causing flameless combustion of said gas mixture by catalytic oxidizing reaction;

(g) means for piezoelectrically igniting said gas mixture, said piezoelectrical means having spark electrodes disposed in said flame combustion chamber and a piezoelectric ignition button for closing and opening a piezoelectric ignition circuit including said spark electrodes;

(h) means for controlling the amount of a gas discharged to the inlet of said catalyst means, said controlling means being disposed movably about said flaming combustion means, said controlling means (h) being adapted for forming an opening leading directly to an external atmosphere at or near the downstream end of said flaming combustion means thereby discharging a portion of the gas in said flaming combustion means directly to the external atmosphere not passing through said catalyst means, and being adapted for closing said opening, thereby introducing the entire portion of the gas in said flaming combustion means to said catalyst means; and (i) means disposed between said gas discharge controlling means and said ignition button for interlocking the operation of the controlling means with that of the ignition button.

2. A heat processing apparatus using liquified gas comprising:

(a) means for jetting out a liquefied gas in a gas reservoir as a fuel gas;

(b) means, of a cylindrical configuration, disposed at the exit of said gas jetting means having external air in-take ports for sucking external air by the ejector effect of a gas jetted out from said gas jetting means thereby generating a gas mixture;

(c) nozzle means disposed at a downstream end of said gas mixture generation means for jetting out said gas mixture;

(d) means, of a cylindrical configuration, disposed downstream of said nozzle means and having a flaming combustion chamber;

(e) an iron tip means disposed at a downstream end of said flaming combustion means in flow communication therewith;

(f) a catalyst means incorporated in said iron tip means for causing flameless combustion of said gas mixture by catalytic oxidizing reaction;

(g) means for piezoelectrically igniting said gas mixture, said piezoelectrical means having spark electrodes disposed in said flame combustion chamber and piezoelectric ignition button for closing and opening a piezoelectric ignition circuit including said spark electrodes;

(h) means for controlling the amount of a gas discharged to the inlet of said catalyst means, said controlling means being disposed movably about said flaming combustion means said controlling means (h) being adapted for forming an opening leading directly to an external atmosphere at or near the downstream end of said flaming combustion means thereby discharging a portion of the gas in said flaming combustion means directly to an external atmosphere not passing through said catalyst means, and being adapted for closing said opening, thereby introducing the entire portion of the gas in said flaming combustion means to said catalyst means;

(i) means disposed between said gas discharge controlling means and said ignition button for interlocking the operation of the controlling means with that of the ignition button;

(j) means for controlling a flow rate of air sucked through said external air-intake ports by increasing and decreasing the opening area of said ports to vary an air/gas mixing ratio of the generated gas mixture said means being disposed movably along an outer surface of said gas mixture generating means; and (k) means for interlocking the controlling movement of said air flow rate control means with the operation of said ignition button such that said external air in-take ports generate a gas mixture at first at an air/gas mixing ratio optimum to piezoelectric ignition and then at an air/gas mixing ratio optimum to catalytic combustion.

3. A heat processing apparatus as defined in claim 2, wherein the gas discharge amount controlling means (h) further comprises:

gas discharge ports perforated through the circumferential wall of the flaming combustion cylinder; and a cylindrical shutter disposed movably either in an axial or circumferential direction along the outer surface of said flaming combustion cylinder for closing and opening said gas discharge ports.

4. A heat processing apparatus as defined in claim 2, wherein the gas discharge amount control means (h) further comprises:

a flaming combustion cylinder which is disposed axially and movably and whose downstream end can be resiliently brought into gas tight contact with an iron tip member by a spring; and an interlocking member attached to said flaming combustion cylinder for moving the downstream end thereof from the iron tip member against the spring force, thereby forming a space between both of said flaming combustion cylinder and the iron tip member.

5. A heat processing apparatus as defined in claim 2, wherein the interlocking means (i) further comprises:

a connection member extended axially along the apparatus and connected at one end to the operating portion of the ignition button and at the other end to the moving portion of said gas discharge amount control means.

6. A heat processing apparatus as defined in claim 2, wherein the air flow rate control means (j) further comprises:

a short cylindrical control member disposed coaxially along the outer circumferential surface of the cylindrical gas mixture generation means so as to move axially or circumferentially to said means for adjusting the opening area of the external air in-take ports to thereby generate a gas mixture of an air-lacking air/gas mixing ratio suitable to piezoelectric gas ignition, an airless air/gas mixing ratio effective for extinguishing the combustion flame and then an air/gas mixing ratio optimum to catalytic combustion.

7. A heat processing apparatus as defined in claim 2, wherein the air flow control means is attached to a connection member which is axially extended along the apparatus and connected at one end to the operating portion of the ignition button and at the other end to the moving portion of said gas discharge amount control means.

8. A heat processing apparatus using liquefied gas comprising:
   (a) means for jetting out a liquefied gas in a gas reservoir as a fuel gas;
   (b) means, of a cylindrical configuration, disposed at the exit of said gas jetting means having external air in-take ports for sucking external air by the ejector effect of a gas jetted out from said gas jetting means thereby generating a gas mixture;
   (c) nozzle means disposed at a downstream end of said gas mixture generation means for jetting out said gas mixture;
   (d) means, of a cylindrical configuration, disposed downstream of said nozzle means and having a flaming combustion chamber;
   (e) an iron tip means disposed at a downstream end of said flaming combustion means in flow communication therewith;
   (f) a catalyst means incorporated in said iron tip means for causing flameless combustion of said gas mixture by catalytic oxidizing reaction;
   (g) means for piezoelectrically igniting said gas mixture, said piezoelectric means having spark electrodes disposed in said flame combustion chamber and a piezoelectric ignition button for closing and opening a piezoelectric ignition circuit including said spark electrodes;
   (h) means for discharging a portion of a gas in said flaming combustion means directly to the external atmosphere not passing through said catalyst means (f) said discharging means being disposed, in the form of an opening directly leading to external atmosphere, at or near the downstream end of said flaming combustion means;
   (i) means for controlling a flow rate of air sucked through said external air-intake ports by increasing and decreasing the opening area of said ports to vary an air/gas mixing ratio of the generated gas mixture said means being disposed movably along an outer surface of said gas mixture generation means; and
   (j) means for interlocking the controlling movement of said air flow rate control means with the operation of said ignition button such that said external air-intake ports generate a gas mixture at first at an air/gas mixing ratio optimum to piezoelectric ignition and then at an air/gas mixing ratio optimum to catalytic combustion.

9. A heat processing apparatus as defined in claim 8, wherein the gas discharge means (j) is manually actuatable for the control of the opening.

10. A heat processing apparatus as defined in claim 8, wherein the gas discharge means comprises a gas discharge port formed at or near the top end of the flaming combustion means.

* * * * *